Feb. 13, 1934.  H. T. THOMAS  1,947,428
CLUTCH THROW-OUT BEARING
Filed June 20, 1932
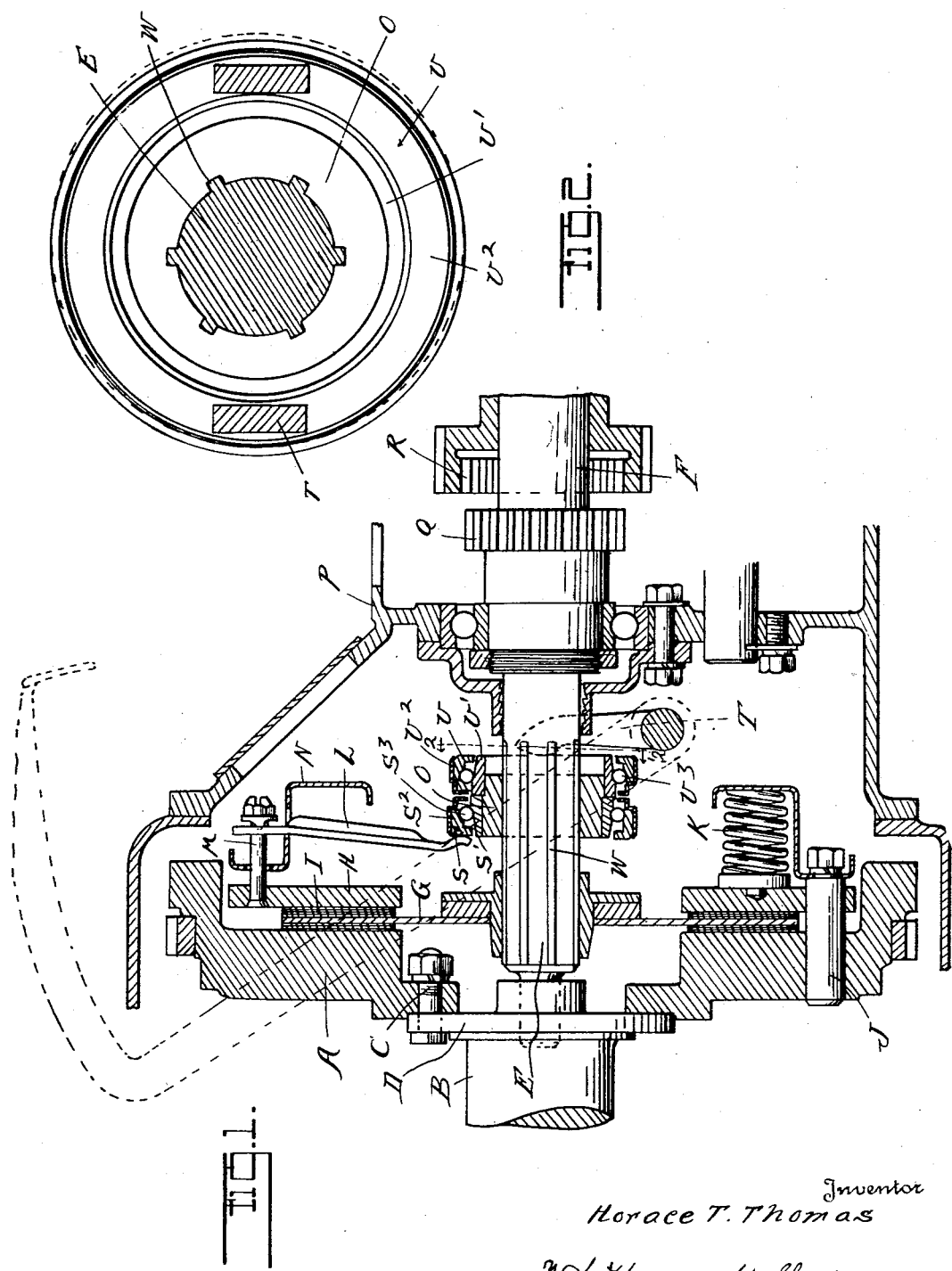
Inventor
Horace T. Thomas
Whittemore Hulbert
Whittemore & Belknap
By
Attorneys Patented Feb. 13, 1934

1,947,428

UNITED STATES PATENT OFFICE 1,947,428

CLUTCH THROW-OUT BEARING

Horace T. Thomas, Lansing, Mich., assignor to Reo Motor Car Company, Lansing, Mich., a corporation of Michigan Application June 20, 1932. Serial No. 618,353

4 Claims. (Cl. 192—13)

The invention relates to clutches of the type more particularly designed for use in motor vehicles for coupling the motor to a variable speed transmission mechanism. With such constructions the driven member of the clutch is intermediate the engine or driving shaft and the propeller or loaded shaft and in certain adjustments is free from both of said shafts. It is therefore desirable to provide means for quickly arresting movement of this intermediate member when the clutch is disengaged to permit of shifting of gears in the transmission mechanism. On the other hand, when this intervening shaft is stationary it is desirable to provide for easily rotating the same so as to facilitate the engagement of any gears thereon with cooperating gears in the transmission. Both of these objects are obtained by the novel construction of throw-out bearing and cooperating parts as hereinafter set forth.

In the drawing:

Figure 1 is a central longitudinal section through a clutch of my improved construction;

Figure 2 is a cross section on line 2—2 of Figure 1.

The clutch employed may be of any suitable construction but as shown A is the driving clutch member which is mounted on the engine shaft B by bolts C securing it to the flange D. E is the driven shaft of the clutch which is intermediate the engine shaft B and an aligned shaft F and under certain conditions is free from rotative connection to either of said shafts. G is a clutch disk mounted upon the shaft E, H is the follower plate of the clutch and I are the clutch facings upon opposite sides of the disk G. J is a guide pin which rotatively couples the follower plate H with the member A, K are the springs for yieldably pressing the follower H against the disk G and L are radially extending throw-out levers cooperating with link bolts M, a clutch housing member N and a slidable collar O on the shaft E to withdraw the follower H from frictional contact with the clutch plate G.

The parts as above specifically described are only representative of any suitable construction of friction clutch in which the friction members are disengaged by the movement of a shiftable collar. Usually this shiftable collar is actuated by a forked rock lever which in turn is actuated by a pedal, and the arrangement is such that the pressure of the collar against the ends of the levers L will retract the follower plate H while the yieldable pressure of the springs K will press said follower plate against the clutch disk when the collar is withdrawn.

As has been stated, it is the object of the invention to quickly arrest movement of the driven shaft E when the clutch is disengaged and also to permit the shaft E when at rest freedom for rotative adjustment sufficient to engage the shiftable gears in the transmission. As illustrated in Figure 1, the shaft E is provided within the transmssion housing P with a gear wheel Q adapted for clutching engagement with a shiftable internal gear R. In case the teeth of the gear wheels Q and R are not in exact registration a slight rotation of the shaft E may be necessary to bring them into engagement and for this reason it is desirable that said shaft should be rotatively free. On the other hand, as the follower plate H and levers L continue to rotate with the member A and as the collar O is pressed against the levers against the tension of the spring K, this will tend to impart rotation to said collar and through it to the shaft E. I have therefore provided the collar O with an anti-friction bearing S preferably a ball bearing, one race member S' of which is fixed upon the collar, the other race member $S^2$ being free to revolve upon the balls $S^3$. The levers L engage the race member $S^2$ and therefore are free to revolve therewith without any considerable frictional drag upon the collar O. However, this will not assist in arresting rotation of the shaft E which is still propelled by its own inertia after the follower H has been disengaged from the clutch plate G.

To place a braking force upon the shaft E and connected parts which will quickly arrest motion thereof and which at the same time will leave said shaft free for rotative adjustment to facilitate intermeshing of the gears I have devised the following construction. Upon the collar O is placed a second ball bearing U including the race member U' which is fixed to the collar, the second race member $U^2$ with the balls $U^3$ therebetween. This ball bearing instead of being concentric with the axis of the shaft E is slightly eccentric thereto so that in the rotation of the shaft there will be an oscillatory movement of the bearing. T is a rock arm actuated by the pedal which bears against the end face of the race member $U^2$ and by its pressure moves the collar O in a direction to release the clutch. The friction of contact of the rock arm T with the race member $U^2$ will hold the latter from rotation but on account of its eccentric position there will be an oscillatory movement imparted thereto transverse to the lever T. Thus the friction between the contacting portion of said lever and the race member will resist oscillation of the latter which will be effective in resisting rotation of the shaft E to bring the same quickly to rest. However, the resistance to rotation through a small angular displacement is very slight and therefore the shaft is free to adjust itself rotatively a sufficient distance for intermeshing the gear Q with the gear R.

The collar O is held from rotation on the shaft E by splines W or other suitable means.

What I claim as my invention is:

1. The combination with a rotary drive member, a rotary driven member and a friction clutch therebetween, of clutch releasing means including a member mounted on said driven member rotatively fixed but longitudinally slidable thereon, means for actuating said member in a direction to release the clutch and an anti-friction rotary bearing on said member engaging said actuating means and rotative about an axis eccentric to the axis of said driven member whereby said eccentric rotation will cause a relative oscillation between the same and said actuating member and will frictionally retard said driven means when the clutch is released.

2. The combination with a rotary driving member, a rotary driven member and a friction clutch therebetween, of clutch releasing means including a member mounted on said driven member rotatively fixed but longitudinally slidable thereon, means for actuating said member in a direction to release the clutch and a ball bearing on said member eccentric to the axis of said driven member in contact with said actuating means whereby the eccentric rotation of said ball bearing will oscillate the same relative to the actuating member bearing thereon and will frictionally retard rotation of said driven member when the clutch is released.

3. The combination with a rotary drive member, a rotary driven member and a friction clutch therebetween, of clutch releasing means including a collar on said driven member rotatively fixed but longitudinally slidable thereon, a clutch releasing element rotating with said drive member and actuated by the sliding movement of said collar, a rotary and a friction bearing on said collar contacting with said element, an actuating member for engaging said bearing to move the same in a direction to release the clutch and an antifriction rotary bearing on said collar contacting with said actuating means and rotative about an axis eccentric to the axis of said driven member whereby a relative oscillation is developed between the contacting portions of said eccentric anti-friction member and said actuating member which frictionally resists rotation of said driven member.

4. The combination with a rotary drive member, a rotary driven member and a friction clutch therebetween including one or more radially extending levers rotating with said driving member, and a collar rotating with and longitudinally slidable upon said driven member for actuating said lever to release the clutch, of a rotary anti-friction bearing on said collar for directly contacting with said lever, a second rotary anti-friction bearing on said collar arranged to rotate about an axis eccentric to the axis of said driven member and an arm engaging said last mentioned rotary anti-friction bearing to actuate the same in a direction to release the clutch whereby the eccentric rotation of said second rotary anti-friction bearing will cause a relative oscillation of the same and the contacting portion of said actuating arm thereby frictionally retarding rotation of said driven member when the clutch is released.

HORACE T. THOMAS.